United States Patent

[11] 3,601,175

| [72] | Inventor | Russell Wardlaw<br>San Rafael, Calif. |
|---|---|---|
| [21] | Appl. No. | 850,710 |
| [22] | Filed | Aug. 18, 1969 |
| [45] | Patented | Aug. 24, 1971 |
| [73] | Assignee | The Cookson Company<br>San Francisco, Calif. |

[54] ARTICULATED GRILLE
4 Claims, 4 Drawing Figs.

[52] U.S. Cl. ........................................ 160/133
[51] Int. Cl. ........................................ E06b 9/01, E06b 9/02
[50] Field of Search .......................... 160/133; 85/8.8, 35; 287/20.5, 135 SR; 52/663

[56] References Cited
UNITED STATES PATENTS

| 2,411,761 | 11/1946 | Stolberg | 85/8.8 |
| 2,865,076 | 12/1958 | Newton et al. | 24/211 |
| 2,880,641 | 4/1959 | Sislik | 85/35 |
| 2,898,988 | 8/1959 | Zoll | 160/229 |
| 2,940,520 | 6/1960 | Cookson, Jr. et al. | 160/229 |
| 3,153,972 | 10/1964 | Holton | 85/35 |

FOREIGN PATENTS

| 639,877 | 3/1962 | Italy | 297/135 SR |

*Primary Examiner*—Peter M. Caun
*Attorney*—Flehr, Hohbach, Test, Albritton and Herbert

ABSTRACT: Articulated grille has identical links arranged in pairs as end links and intermediate links. Spoollike connectors loosely unite ends of intermediate links and hatlike connectors unite the end links and receive horizontal link-connecting rods loosely therethrough. Link-positioning rods extend through medial holes in the links and hat-shaped end keepers and retaining ring keepers positioning rods maintain the grille assembly.

PATENTED AUG 24 1971  3,601,175
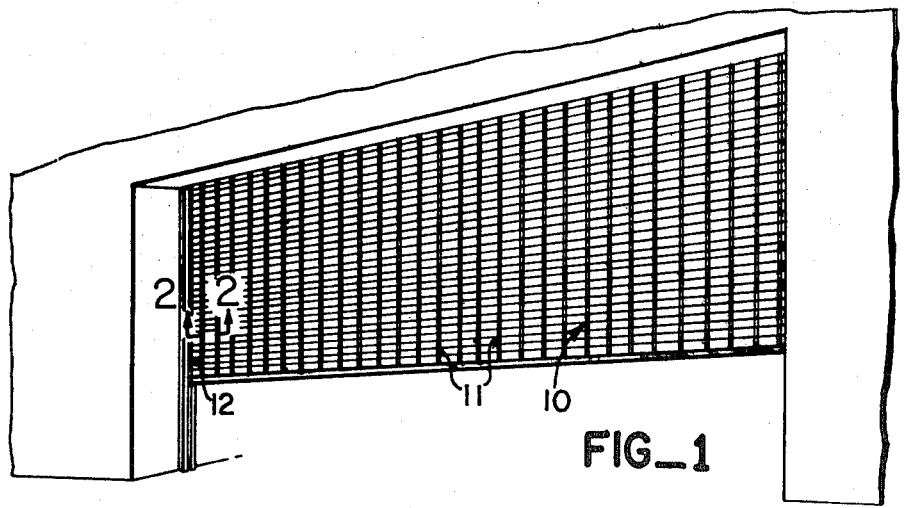
FIG_1
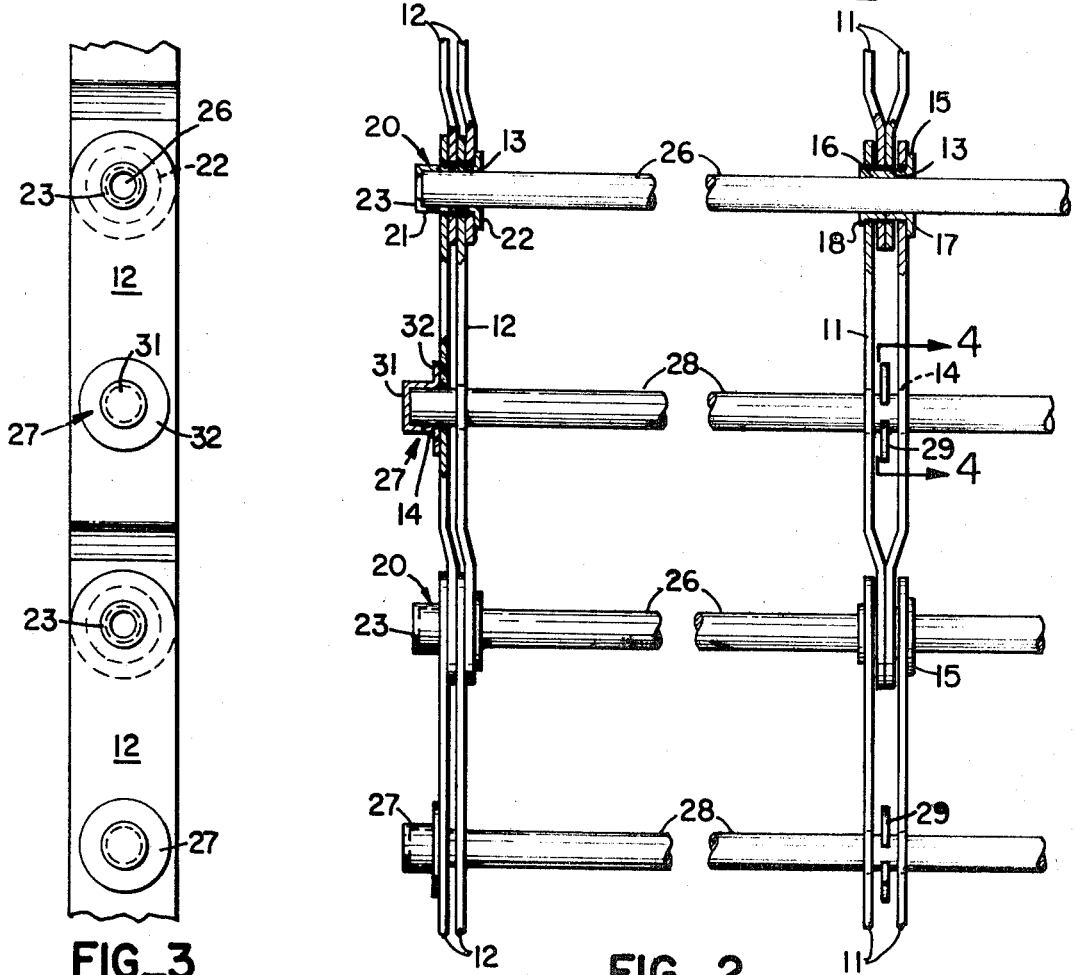
FIG_3    FIG_2
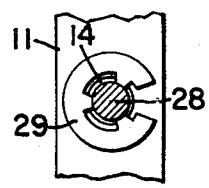
FIG_4
INVENTOR.
RUSSELL WARDLAW
BY Flehr, Hohbach, Test,
Albritton & Herbert
ATTORNEYS

ARTICULATED GRILLE

BACKGROUND OF THE INVENTION

This invention pertains generally to grilles and more particularly to articulated rollable grilles.

Grilles heretofore have frequently required an undue amount of manufacturing time to assemble, being that they incorporated a great number of interconnecting parts including fasteners and keepers. In certain instance prior art grilles in service became difficult to operate when the weight of the grille distorted the grille rods used for hinges, thereby preventing a free hinging action.

SUMMARY OF THE INVENTION AND OBJECTS

In summary, the invention pertains to a grille including a plurality of substantially identically shaped links each having two end holes and a medial hole. The links are arranged in parallel pairs with the ends of adjacent pairs of links being overlapped and flanged ferrules are disposed in the holes pivotally connecting the overlapped link ends, the ferrules loosely receiving therein link-interconnecting rods. A plurality of link-positioning rods are disposed loosely in the medial holes and are equipped with keeper means at the ends of the rod and adjacent each pair of intermediate links to limit movement of the links with respect to the rods. The flanged ferrules on the interconnecting rods are of hatlike configuration providing flanges arranged inwardly of the pairs of end links serving as a seat for the interconnected end portions thereof.

A general object of the present invention is to provide an improved articulated rolling grille which has a smooth rolling action making it easy to operate.

Another object of the invention is to provide a grille of the above character in which the grille rods, intermediate, and end links can be readily assembled with a minimum of fastener parts.

Another object of the invention is to provide a rolling grille of the above character in which the horizontal rods can be readily passed through the holes in the intermediate and end links and the grille maintained in the assembled condition by employing keepers or fasteners on alternate rods only.

Additional objects and features of the invention will appear from the following description in which the preferred embodiment has been set forth in detail in connection with the accompanying drawing.

A BRIEF DESCRIPTION OF THE DRAWING

FIG. 1 is a perspective view of an articulated rolling grille embodying the present invention;

FIG. 2 is an enlarged view, partially in section, taken along the line 2—2 of FIG. 1;

FIG. 3 is an end view of the grille section shown in FIG. 2; and

FIG. 4 is a sectional view taken along the line 4—4 of FIG. 2.

DESCRIPTION OF THE PREFERRED EMBODIMENT

A grille constructed in accordance with the present invention is shown in FIG. 1. It consists of a plurality of intermediate links 11 and end links 12. The end links and intermediate links are substantially identical in size and shape and each are arranged in pairs, FIG. 2. Each link is provided with three holes, two end holes 13 and a medial or central hole 14. The axes of the holes extend in a direction at right angles to the plane of the links. One end of each of the links 12, 13 is offset with respect to the remainder of the link so that when the links are interconnected a chain of links will be aligned. However, as is readily apparent, the links may be straight if desired and mounted so that every other link in a chain is in alignment.

The offset ends of intermediate links 11 are placed face-to-face and are mounted between the ends of two adjacent links so that the holes 13 are in alignment. The intermediate links are pivotally connected at their ends by spoollike, flanged ferrule connectors 15 which include cylindrical ferrules 16 provided with substantially flat, radially outwardly extending end flanges 17 and 18 that engage the links and retain them upon the ferrule. The outside diameter of the connector ferrule is slightly smaller than the end holes 13 of the links 11, permitting the links to rotate or pivot with respect to the ferrule. The distance between the end flanges 17, 18 is greater than the thicknesses of four links. Thus, the spoollike connectors, in addition to joining the intermediate links into a chain, also serve to permit pivotal movement of the links about the ferrules of the connectors 15.

The end links 12 are arranged in parallel pairs with the offset end portions being overlapped with the straight end portions of the next adjacent pair of end links, the outer one of the offset end portions extending between the spaced straight end portions of the adjacent pair of links. The overlapped ends of the links 12 are pivotally connected in a chain by hatlike, flanged ferrule connectors 20. The hatlike connectors 20 include cylindrical ferrules 21 provided with substantially flat, radially extending flanges 22, 23, FIG. 2. The ferrule 21 has an outside diameter slightly smaller than the end holes 13 of the end links 12 permitting the links to rotate or pivot with respect to the ferrule. The axial length of the ferrule greatly exceeds its outside diameter and the diameter of the hole 13 by about 14 percent so that the outer one of the end links will bind against the ferrule when the grille is skewed and will not disengage the connector 20. The inwardly disposed flanges 22 extend outwardly from the ferrules 21 to engage the links and restrain them from inward shifting on the ferrule serving as a seat. The outwardly disposed flanges 23 extend inwardly from the ferrules to serve as abutments for the grille rod ends.

Horizontally extending, link-interconnecting rods 26 are slidably carried by the flanged ferrule connectors 15, 20. The ends of the rods 26 engage and seat against the inwardly directed flanges 23 of the hatlike connector 20. The inside diameter of the ferrules 16, 21 is slightly larger than the rod 26 outside diameter to permit sliding therebetween during grille assembly and operation to ensure free movement between the parts when the grille is rolled and unrolled in use.

To maintain the grille assembly 10 in the desired configuration, flat abutment-providing keepers 27, 29 are provided on link-positioning rod 28. The keepers include hatlike end keepers 27 which are received in a press fit over the ends of positioning rods 28 which extend horizontally through the central or medial holes 14 of the links 11, 12. Between the spaced air of intermediate links 11, flat link abutment flanges or ring keepers 29 are fixedly secured to the link positioning rods 28 to limit movement of the links axially of the rods. Satisfactory keepers 29 are sold in a variety of sizes as retaining rings under the Truarc trademark by Waldes Kohinoor, Inc., Long Island City, New York, 11101. Outward movement of the end of the links 12 axially of the rods is restrained by flat link abutment flanges 32 on the end keepers 27.

The end keepers 27 are each of a generally hatlike configuration defined by a rod enclosing cap portion 31 and the flat outwardly extending link abutment flange 32. The inside of the cap portions 31 may be serrated or have other provision for ensuring a press fit with the ends they enclose of the positioning rod 28.

Accordingly from the above it will be understood that adjacent pairs of links are pivotally interconnected in a chain by means of flange-equipped connecting ferrules 15, 20 which slidably and rotatably receive the link-interconnecting rods 26. The link-positioning rods 28, which extend through the central holes 14 of links 11, 12 are equipped with flanged end keepers 27 and ring keepers 29 serving to limit shifting movements of the links not only with respect to the positioning rods 28 but with respect to the interconnecting rods 26. This follows from the size of the link holes 13, 14 in relation to the members extending therethrough such as to permit but a limited skewing of the links and rods before binding between the parts is effected. The overlapped end links will effect binding engagement with the ferrules 21 rather than slide off the connectors 20. Thus, the grille 10 is maintained in the assembled condition by the use of flanged keepers solely on the link-positioning rods 28 and the cooperative relationships between the link end holes and connector ferrules. The desired spacing is maintained between intermediate links throughout the length and width of the rolling grille by the foregoing arrangement.

The operational advantages of the rolling grille may now be briefly described as follows:

The link-connecting members 15, 20 permit relatively free pivotal movement of the links on these members, and there is little opportunity for distortion to occur on these members which would inhibit this free pivotal movement. The end keepers 27 and keeper rings 29 limit the skewing tendency of the links as well as movement of the links with respect to the horizontal rods, thus maintaining the grille in the desired configuration. The construction of the ends of the grille is particularly advantageous in that the grille may be assembled with fewer parts and more expeditiously than was previously possible. Moreover, once assembled the grille is not readily disassembled.

It is apparent from the foregoing that there has been provided an improved rolling grille of simplified construction which can be readily assembled from a minimum amount of material.

What is claimed is:

1. In a rollable grille, a plurality of flat links of substantially identical size and shape, each of said links having a hole in each end thereof and a hole in a medial portion thereof, the axes of the holes being at a right angle to the plane of the link, one end of each of the links being offset from the remainder of the link a distance at least equal to the thickness of the link with the remainder of the link being substantially planar, said links including end links arranged in pairs in generally parallel relation, the ends of adjacent, consecutive pairs of end links being overlapped such that an end link of one pair is interleafed between the pair of end links adjacent thereto maintaining the pairs of end links in space-apart, generally parallel relationship, the remainder of said links being intermediate links arranged in pairs with their offset ends in face-to-face engagement, the engaging ends of each pair being positioned between the spaced ends of the next adjacent pair in one direction and over the engaging ends of the next pair of links in the opposite direction, the pairs of end links and pairs of intermediate links being arranged such that the respective medial and end holes in said links are in alignment, first flanged ferrules mounted in the end holes of said intermediate links and pivotally connecting the same in consecutive pairs so as to form a chain of intermediate links, second flanged ferrules mounted in the end holes of said end links and pivotally connecting said end links in consecutive pairs so as to form a chain of ends links, a plurality of link-interconnecting rods disposed loosely in said first and second ferrules of said end holes and rotatably accommodated therein so that said links may pivot thereabout, a plurality of link-positioning rods disposed loosely in said medial holes in said pairs of links, a plurality of keeper means mounted on said rods serving to limit movement of said chain of intermediate links axially along said rods, end keeper means fixedly received over the ends of said link-positioning rods to limit outward movement of said chain of end links with respect to said rods, said second flanged ferrules on the ends of said link-interconnecting rods including substantially closed end portions mounted over the ends of said link-interconnecting rods and having radially outwardly extending flanges disposed inwardly of said chain of end links serving to limit inward movement of said chain of end links with respect to said interconnecting rods.

2. The grille defined in claim 1 wherein said pairs of end links are arranged with the offset ends of the pairs of links overlapping the straight end portions of the adjacent pairs of end links.

3. The grille defined in claim 1 wherein said end keeper means secured to said link-positioning rods are generally of hatlike configuration and include substantially flat, outwardly extending link-abutting flanges engaging the medial portions of the outer ones of end links in the pairs thereof, and wherein said keeper means comprises split rings secured to said link-positioning rods presenting flat abutment surfaces to the medial portion of the pairs of intermediate links.

4. The grille defined in claim 1 wherein said first and second flanged ferrules have larger inside diameters than the outside diameters of said link-interconnecting rods and an outside diameter smaller than the diameter of said end holes of said links.